Nov. 11, 1924.
G. R. MAUPIN
1,514,712
TRAVELING TUBE EXPANDER
Filed Aug. 27, 1923
2 Sheets-Sheet 1
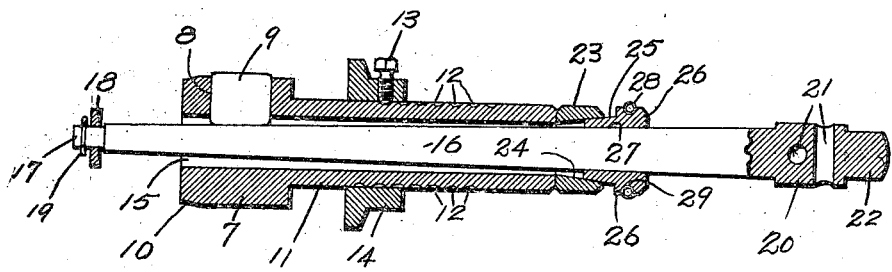
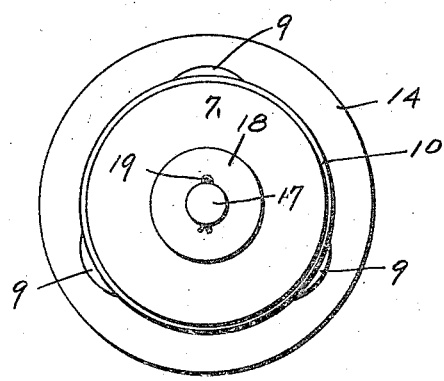
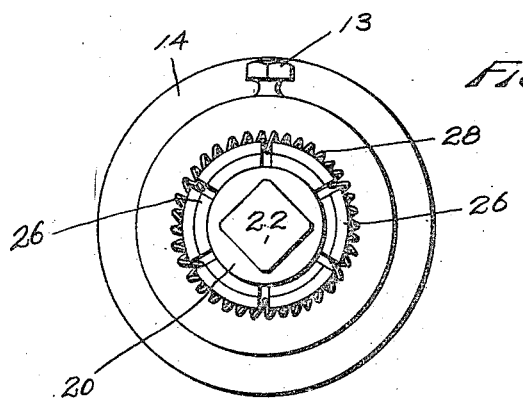
INVENTOR
GRAVES R. MAUPIN
By Edward E Longan
ATTY.

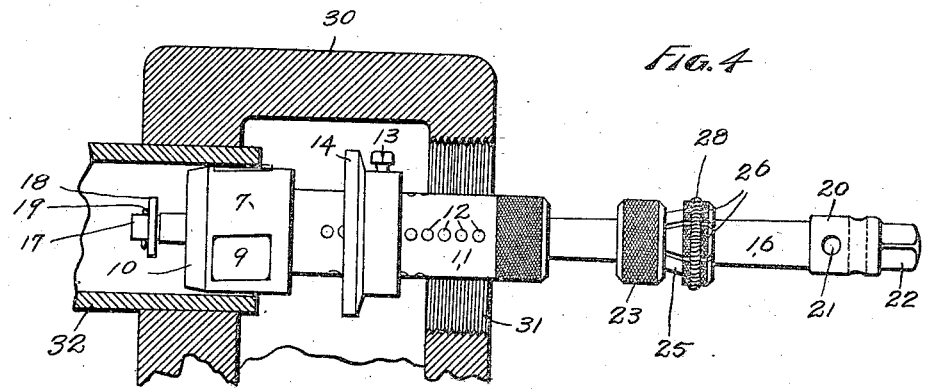
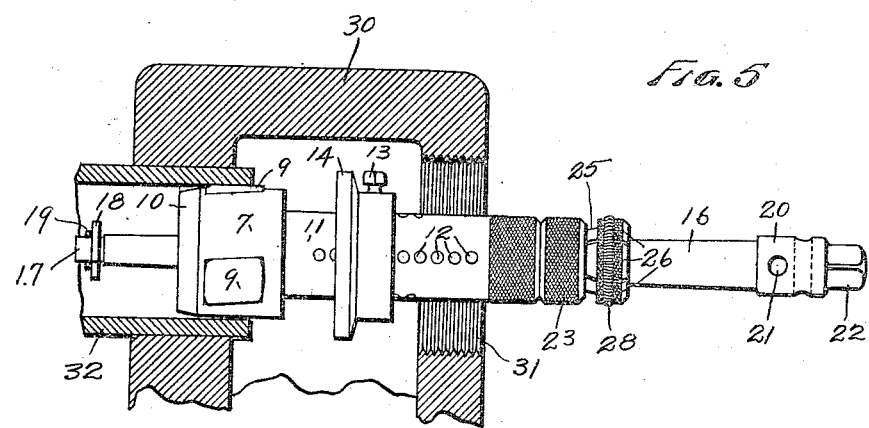
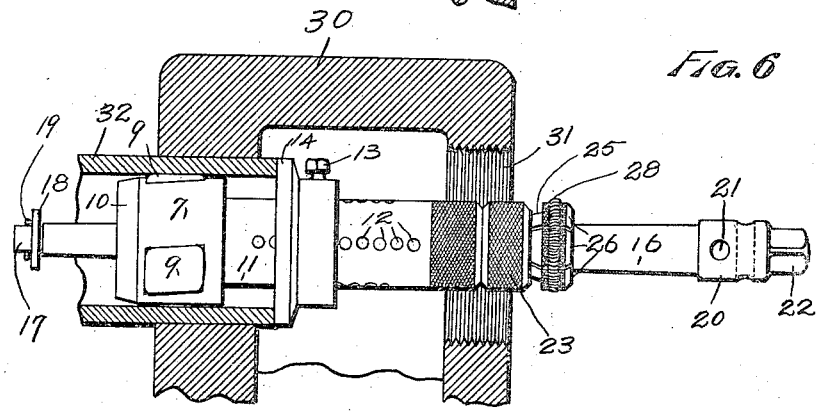

Patented Nov. 11, 1924.

1,514,712

UNITED STATES PATENT OFFICE.

GRAVES R. MAUPIN, OF MOBERLY, MISSOURI, ASSIGNOR TO THE J. FAESSLER MANUFACTURING COMPANY, A COPARTNERSHIP COMPOSED OF JOHN W. FAESSLER, CHRISTINIA FAESSLER, LOUIS E. FAESSLER, AND GRAVES R. MAUPIN, ALL OF MOBERLY, MISSOURI.

TRAVELING TUBE EXPANDER.

Application filed August 27, 1923. Serial No. 659,453.

*To all whom it may concern:*

Be it known that I, GRAVES R. MAUPIN, a citizen of the United States, and resident of the city of Moberly, county of Randolph, and State of Missouri, have invented certain new and useful Improvements in Traveling Tube Expanders, of which the following is a specification containing a full, clear, and exact description, reference being had to the accompanying drawings, forming a part thereof.

My invention relates to improvements in traveling tube expanders and has for its primary object a tube expander for seating tubes in thick sheets such as are used in oil stills, and in which the expander when in use travels longitudinally in the tube so that a relatively long joint can be made with an expander employing short rollers.

A further object is to construct a traveling tube expander in which the depth of insertion of the mandrel in the expander can be controlled.

A still further object is to construct a traveling tube expander which is provided with a gage so that the travel of the expander in the tube can be accurately regulated.

In the drawings:

Figure 1 is a longitudinal sectional view of my device showing the mandrel in position and with parts thereof broken away and in section;

Fig. 2 is an enlarged front elevation of the expander;

Fig. 3 is an enlarged rear view of the expander;

Fig. 4 is a side elevation of my expander showing the first step in expanding a tube;

Fig. 5 is a similar view showing the second step or the commencement of the expansion and Fig. 6 is a similar view showing the expander at its farthest limit of travel in the tube.

In the construction of my device I employ a cage 7 which is provided with the usual roller openings 8, the radial axes of which are arranged at an angle to the radial axes of the cage. Within these openings are placed rollers 9. The forward end of the cage is beveled as at 10 so as to provide a more ready insertion of the cage. Formed integral with the rear of the cage is a sleeve 11, which sleeve is of less diameter than the cage. The sleeve is provided with a plurality of indentations 12 into which the end of the set-screw 13 is adapted to fit. The set-screw is carried by a depth gage or collar 14 which is slidably mounted on the sleeve 11. The indentations 12 are staggered around the sleeve 11 so as to provide adjustment to and from the cage. The purpose of this adjustment will be explained in detail later. Extending centrally through the sleeve and cage is a cylindrical bore 15 through which the tapered portion 16 of the mandrel is inserted. The small end of the mandrel is provided with a reduced cylindrical portion 17 over which is placed a washer or disk 18. This disk is of larger diameter than the bore 15 and is for the purpose of preventing the withdrawal of the mandrel entirely from the cage. The disk 18 is preferably held in position by means of a cotter-pin 19. Formed integral with the large end of the tapered portion 16 is a cylindrical portion 20 which is provided with suitable openings 21 to permit the insertion of a bar or tool for turning the mandrel, and also with the square portion 22 which permits the employment of a wrench. Slidably mounted on the mandrel is a collar 23 which is provided with a tapered bore 24. The taper in this bore corresponds to the taper 25 formed on the outer surface of the segments 26. The segments 26 are provided with an inner taper 27 which corresponds to the taper of the mandrel. The segments are held in position on the mandrel by means of an endless coil spring 28 which is seated in a groove 29 formed in the segments.

The operation of my device is as follows:

After the tube has been placed in position in the boiler head 30 through the handhole 31 the expander is ready to be inserted. The collar 14 is first adjusted sufficiently far back of the rollers so that the device can assume the position shown in Fig. 6. The mandrel is then pushed forward expanding the rollers, or in other works, forcing them outward in the slots or openings until they contact with the inner periphery of the tube 32. The mandrel is then rotated and due to the position of the rollers the same is drawn forward. This movement is continued until the mandrel turns reasonably hard. The collar 26 is then moved forward so that it contacts with the end of the sleeve 11, then the split collar which is composed of the segments 26 is moved forward on the mandrel so that it enters the tapered bore in the collar 23. This procedure prevents any further feeding of the mandrel into the cage for the reason that in order to permit feeding, the mandrel will have to pass through the collar formed of the segments 26, and in order to do this the segments must expand, which expansion is prevented by the collar 23. As the mandrel can no longer move forward, the collar 23 presses against the end of the sleeve 11 and causes the cage 7 to turn. This movement causes the cage to rotate and expand the tube. The rotation of the cage together with the position of the rollers 9 also has a tendency to pull the cage into the tube. This feeding movement continues until the collar 14 abuts against the tube as in Fig. 6. The rotation is then continued until the cage turns easily in the tube. The mandrel is then rotated in a reverse direction which feeds it outward and permits the rollers to fall back and be released from the walls of the tube, then if the tube is not tight enough, the operation is repeated until the proper seat on the tube has been obtained.

It will be noted from the foregoing that with my device it is possible to roll tubes within holes of various lengths with the same tool. The depth to which the device can be inserted into a tube is limited only to the length of the sleeve 11 and the length of the mandrel so that one tool can be used for a great variety of tube seats. Furthermore by having the collar 14 contacting with the end of the tube for limiting the depth of insertion or feeding of the cage, there is no possibility of springing or bending the sheet which would be the case if the collar 14 were so arranged as to contact with the sheet instead of with the tube, because then there would be a tendency to push the sheet inward or draw the tube outward, but by having the collar contact with the end of the tube all of this tendency is eliminated.

Having fully described my invention what I claim is:—

1. A traveling tube expander comprising a cage, a sleeve formed integral with said cage, rollers located in said cage and adapted to be projected beyond the periphery of said cage, a tapered mandrel movable through the cage and sleeve and contacting with said rollers, adjustable means carried by said mandrel for limiting its movement through said cage, and adjustable means carried by said sleeve for limiting the depth of insertion of the cage in a tube.

2. A traveling tube expander comprising a cage, a sleeve formed integral with said cage, rollers located in said cage and adapted to be projected beyond the periphery of said cage, a tapered mandrel movable through the cage and sleeve and contacting with said rollers, adjustable means carried by said mandrel for limiting its movement through said cage, and a collar adjustably mounted on said sleeve and adapted to contact with the end of a boiler tube for limiting the travel of said expander in said tube.

3. A traveling tube expander comprising a cage, a sleeve formed integral therewith, rollers located in said cage and adapted to have their periphery projected beyond the periphery of the cage, the longitudinal axis of said rollers being at an angle to the longitudinal axis of the cage, a tapered mandrel movable centrally through the cage and sleeve and adapted to contact with said rollers for causing said projection, adjustable means carried by said mandrel for limiting its movement through said cage, and means adjustably carried by the cage for limiting the distance of its travel.

4. A traveling tube expander comprising a cage, a sleeve formed integral therewith, rollers located in said cage and adapted to have their periphery projected beyond the periphery of the cage, the longitudinal axis of said rollers being at an angle to the longitudinal axis of the cage, a tapered mandrel movable centrally through the cage and sleeve and adapted to contact with said rollers for causing said projection, adjustable means carried by said mandrel for limiting its movement through said cage, and a collar adjustably mounted on said sleeve and adapted to contact with the end of a boiler tube for limiting the travel of said expander in said tube.

5. A traveling tube expander comprising a cage having a sleeve projecting longitudinally and rearwardly therefrom, expanding rollers located in said cage, a mandrel extending through the sleeve and cage, adjustable means carried by said mandrel for limiting its movement through said cage, and adjustable means carried by said sleeve for limiting the length of travel of said cage and rollers in a tube.

6. In a traveling tube expander having a cage and expanding rollers, a sleeve extending rearwardly from said cage, an adjustable collar mounted on said sleeve for limiting the depth of travel of the cage in a tube, means for holding said collar in desired adjustment, a tapered mandrel extending through said sleeve and cage and contacting with said rollers, and means adjustably mounted on the mandrel whereby its travel through the sleeve and cage may be limited.

7. In a traveling tube expander provided with a cage, expanding rollers mounted in said cage, a sleeve formed integral with said cage, an adjustable collar mounted on said sleeve for limiting the travel of the cage in a tube, a tapered mandrel extending through said sleeve and cage and contacting with the rollers, and an adjustable stop carried by said mandrel for limiting its travel through said sleeve and cage.

In testimony whereof, I have signed my name to this specification.

GRAVES R. MAUPIN.